Aug. 8, 1967

D. G. TIPOTSCH 3,335,279

THERMOCOUPLE RADIATION DETECTOR WITH AN INTEGRATOR
IN THE FEEDBACK PATH OF THE AMPLIFIER TO
COMPENSATE FOR THE INTEGRATING
EFFECT OF THE DETECTOR

Filed June 24, 1964

INVENTOR.
DONALD G. TIPOTSCH
BY

ATTORNEY 3,335,279
THERMOCOUPLE RADIATION DETECTOR WITH AN INTEGRATOR IN THE FEEDBACK PATH OF THE AMPLIFIER TO COMPENSATE FOR THE INTEGRATING EFFECT OF THE DETECTOR
Donald George Tipotsch, Placentia, Calif., assignor to Beckman Instruments, Inc., a corporation of California
Filed June 24, 1964, Ser. No. 377,573
4 Claims. (Cl. 250—83.3)

This invention relates to radiation detection and more particularly to an electrical circuit for use with thermal type detectors which provides an electrical signal output which is a substantial replica of the original radiation signal impinging upon the detector.

Detectors for the infrared region of the radiation spectrum commonly take the form of the thermal type detector such as, for example, a thermocouple. The thermal type detector, commonly referred to as a "slow detector," has the characteristic of producing an electrical current output which is the integral of the radiation input and lags the radiation input by a time phase of 90°. For example, when these detectors are illuminated with chopped radiation of equal on and off peroids, the electrical output signal is shifted in time phase by 90° and each individual optical pulse is integrated and decays to zero infinity. The electrical signal output therefore does not represent the amplitude of the individual pulses but includes the "tails" of all preceding pulses.

It is, therefore, the object of this invention to provide a method and apparatus for producing an electrical signal output which is a substantial reproduction of the original radiation signal input to a slow detector.

To accomplish this the present invention generally contemplates an A.C. amplifier having the detector output connected to its input with a compensating feedback loop between the amplifier and the detector. The feedback loop includes an integrating network which performs upon the feedback signal an integration equivalent to the integration performed by the detector upon the optical signal. The result of this feedback is that the amplifier circuit differentiates the electrical signal to the same extent as it is integrated by the detector.

Other objects and many of the attendant advantages of this invention will be more readily appreciated as the same becomes better understood by reference to the following detailed description when considered in connection with the accompanying drawing in which.

Figure 1:
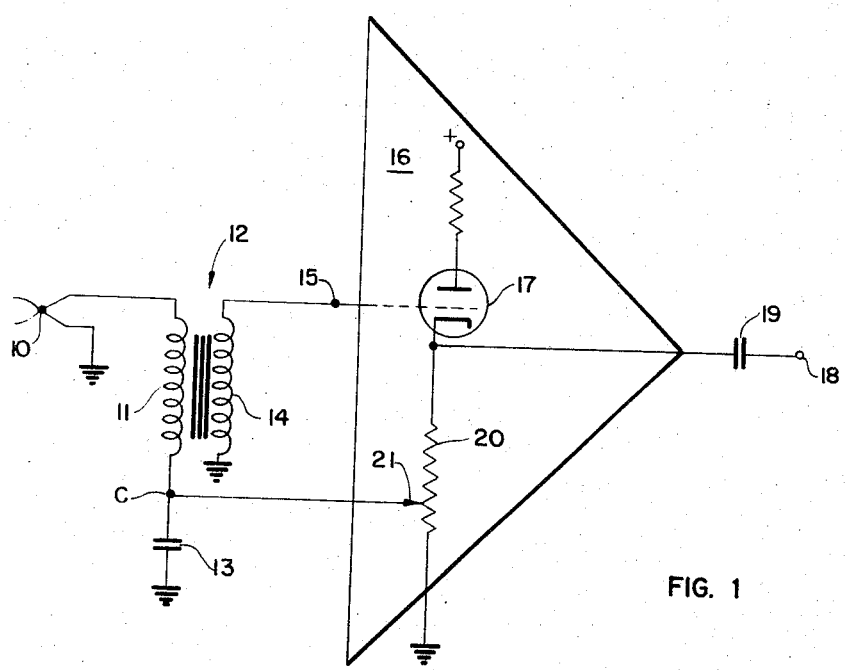
FIG. 1 is an electrical schematic diagram of one exemplary embodiment of this invention.

Referring now to FIG. 1 there is illustrated an infrared detector 10 of the thermal type, such as a thermocouple, having one of its output terminals connected to one side of primary winding 11 of isolation transformer 12. The other output terminal of detector 10 is connected to any suitable point of common potential such as, for example, circuit ground. The other end of primary winding 11 is connected through capacitor 13 to the point of common potential.

Secondary winding 14 of transformer 12 has one end thereof connected to the input terminal 15 of amplifier 16 and the other end thereof connected to the point of common potential, it being understood that amplifier 16 has a common grounded input and output terminal.

Amplifier 16 may conveniently comprise a high gain A.C. amplifier having high input impedance to prevent loading of detector 10. The amplifier may have several stages and conveniently may be provided with an output stage comprising tube 17 connected in a cathode follower configuration. Output terminal 18 is connected through the coupling capacitor 19 to the cathode of tube 17. The cathode of tube 17 is connected through resistor 20 to the point of common potential. Cathode resistor 20 has a slider 21 connected to the junction of capacitor 13 and primary winding 11 of transformer 12 to provide a negative feedback loop for the system.

The portion of resistor 20 between the cathode of tube 17 and slider 21 together with capacitor 13 forms a compensating network to compensate for the integration of the radiation signal produced by detector 10 and takes the form of an integrating network. By feeding back an integrated output signal the system reaches a steady state condition wherein the electrical signal output of the system will be a substantial reproduction of the radiation input since the feedback amplifier with the integrating network in the feedback loop operates to differentiate the signal to the same degree it was integrated by the detector.

Figure 2:
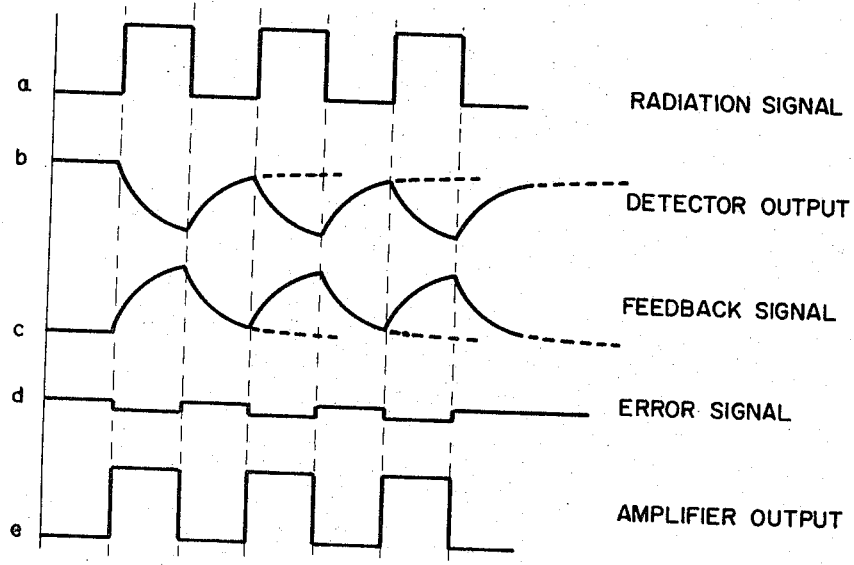
FIG. 2 illustrates optical and electrical signals at various points within the system of FIG. 1.

FIG. 2a illustrates a chopped radiation signal having equal on and off periods. When the radiation signal of FIG. 2a impinges upon a thermal type detector such as a thermocouple the electrical signal output of the detector is that illustrated in FIG. 2b. As indicated, the detector integrates the input signal and shifts it in time by 90°. The trailing edge of each pulse becomes asymptotic to the reference line at infinity. Thus, each succeeding pulse includes the "tails" of all preceding pulses. This results in a shift in the D.C. zero level and when the electrical signal output of the detector is passed through a transformer to remove the D.C. reference and provide an alternating current output, information as to the true amplitude of the radiant energy pulse is lost.

FIG. 2c represents the feedback signal at c developed across capacitor 13. By arranging the integrating network in the feedback loop to perform an integration equivalent to that performed by the detector 10 the feedback signal is provided which is similar to that of the detector output but is opposite in phase. This results in an error signal produced at the input of amplifier 16 which is a substantial replica of the radiation input signal to detector 10. This error signal is illustrated in FIG. 2d. The output of amplifier 16 at terminal 18 with respect to the point of common potential is illustrated at FIG. 2e.

It should be understood that the circuit illustrated is operable for all radiation input signals to detector 10 and is not limited to the pulse type radiation signal illustrated in FIG. 2a. The detector output is not necessarily a negative going signal for a particular radiation input but depends only upon the phasing of the detector.

It is further apparent that the integrating condenser in the feedback loop need not be connected in the primary circuit of transformer 12 but alternatively may be connected to secondary winding 14 in a manner similar to the connection in the primary circuit.

Figure 3:
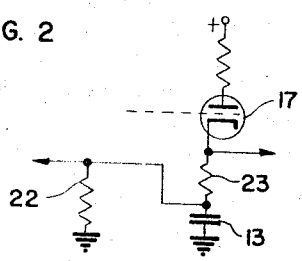
FIG. 3 illustrates an alternative embodiment of FIG. 1.

An alternative embodiment of the integrating circuit is illustrated in FIG. 3. In this circuit a separate discharge resistor 22 is provided and integrating condenser 13 is placed in series with cathode resistor 23 between the cathode of tube 17 and the point of common potential.

It is also apparent that the isolation transformer 12 may be replaced by other types of input circuits.

It should be understood that the foregoing embodiments are illustrated and described as only illustrative embodiments of this invention and that other modifications and alterations may be made by those skilled in the art without departing from the spirit and scope of the invention as set forth in the appended claims.

What is claimed is:

1. A radiation detection and conversion circuit comprising:
  a thermal type detector;
  amplifying means connected to said detector for amplifying the electrical signal output thereof; and feedback means including integrating means connected between at least a portion of the output of said amplifier and said thermal detector to compensate for the integrating effect of said thermal type detector whereby the output of said amplifying means is a substantial replica of the radiation pulse striking said detector.

2. A circuit for detecting radiation pulses and producing an electrical signal output which is a substantial replica of the radiation pulses comprising:
   a thermal type detector;
   means coupled to said detector for removing any D.C. component thereof and providing an alternating current output;
   amplifying means connected to said last named means for amplifying said signal; and
   feedback means including integrating means connected between the output of said amplifying means and said said thermal detector for compensating for the integrating effect of the thermal type detector whereby the output of said amplifying means is a substantial replica of the radiation pulses striking said detector.

3. A radiation detection circuit for producing an electrical signal which is a substantial replica of the radiation signal striking the detector comprising:
   a thermal type radiation detector;
   a transformer having a primary and a secondary winding;
   an integrating capacitor;
   circuit means connecting said thermal type detector, said primary winding and said integrating capacitor in electrical series circuit;
   an amplifier connected across said secondary winding; and
   means connecting at least a portion of said output in negative feedback relation to the junction of said integrating capacitor and said primary winding whereby the integrating effect of said thermal type detector is compensated.

4. A radiation detection circuit for producing an electrical signal which is a substantial replica of the radiation signal impinging upon the detector comprising:
   radiation detection means producing an electrical signal output which is substantially the integral of the radiation signal impinging upon said detector;
   amplifier means amplifying said electrical signal;
   negative feedback means connecting at least a portion of the output of said amplifier means to the input thereof;
   said negative feedback means including means for integrating the feedback signal whereby the error signal at the input of said amplifier means is a substantial replica of said radiation signal.

References Cited

UNITED STATES PATENTS

| | | | |
|---|---|---|---|
| 2,497,129 | 2/1950 | Liston | 250—83.3 |
| 3,089,034 | 5/1963 | Meade | 250—83.3 X |
| 3,094,617 | 6/1963 | Humphries et al. | 250—83.3 |
| 3,193,681 | 7/1965 | Schwartz | 250—83.3 |

RALPH G. NILSON, *Primary Examiner.*

ARCHIE R. BORCHELT, *Examiner.*

S. ELBAUM, *Assistant Examiner.*